VARYING BANDWIDTH FREQUENCY SHIFT KEYING RECEIVER
Filed March 15, 1967
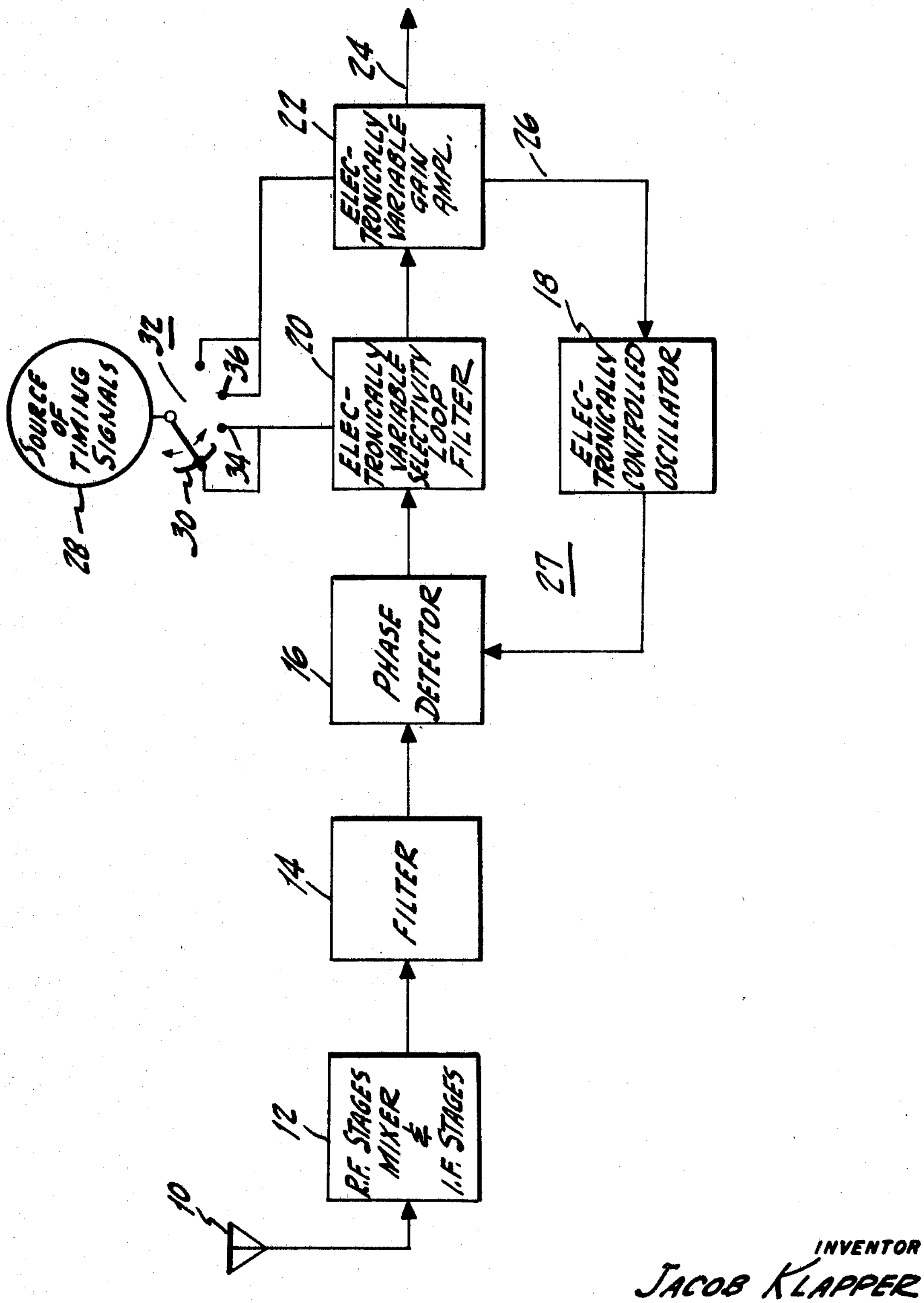
INVENTOR
JACOB KLAPPER
BY Semin Yaffee
ATTORNEY United States Patent Office 3,510,779

Patented May 5, 1970

3,510,779

VARYING BANDWIDTH FREQUENCY SHIFT KEYING RECEIVER

Jacob Klapper, New York, N.Y., assignor to RCA Corporation, a corporation of Delaware Filed Mar. 15, 1967, Ser. No. 623,324
Int. Cl. H04l 27/14
U.S. Cl. 325—320 7 Claims

ABSTRACT OF THE DISCLOSURE

In frequency shift keying radio telegraphy, the bandwidth of the transmitted wave, when changing from one frequency to another, is very broad. However, to exclude extraneous noises the receiver is sharply tuned to the several transmitted frequencies. This sharp tuning results in band clipping by the receiver during the time that the transmitted wave is changing in frequency and therefore in a gradual change in the output of the receiver that indicates that the frequency of the received wave has changed, whereby the speed of communication is limited and the chance of an error near the limiting speed is increased. Means are provided to increase the speed of communication and to reduce the errors in reception by broadening the tuning of the receiver only during the periods of time that a transmitted wave can change in frequency.

Background of the invention

This invention relates to a receiver for frequency shift keyed transmitted waves. It is known to transmit a wave at one frequency for a short period of time to indicate one signal, such as a mark, for example, and to transmit a wave of a different frequency for an equal period of time to indicate a different signal, such as a space. The receiver for such signalling, called frequency shift keying, is normally tuned sharply to the two frequencies that it will receive, whereby only the noise in a narrow band of frequencies is received with the signal and the signal-to-noise ratio is thereby increased.

To increase the speed of communication, the periods through which the transmitted frequencies remain constant is shortened and the periods during which the frequency shift takes place is made as short as possible. However, a quick change of frequency from one value to another produces many frequencies outside of the narrow band of frequencies to which the receiver is tuned, whereby the indication in the receiver of the frequency is blurred to the point where it takes a substantial period of time for the receiver to respond to the changed frequency. As the speed of signalling is increased, a point is reached where the response of the receiver may not clearly indicate that the transmitted wave has changed in frequency, whereby the accuracy of communication for frequency shift keying is impaired. If, to remedy this difficulty, the bandwidth of the receiver is increased, the added noise within the widened bandwidth will also be received, thereby decreasing the signal-to-noise ratio.

It is an object of this invention to provide an improved receiver for frequency shift keying communications.

It is a further object of this invention to provide a receiver for frequency shift keying communications including means for providing a sharper indication of change in frequency from one of the received frequencies to the other thereof.

Another object of this invention is to provide means for increasing the speed of communication by frequency shift keying.

It is still a further object of this invention to provide a receiver which exhibits less errors in reception in frequency shift keying than known such receivers.

Summary of the invention

In accordance with the invention, the tuning of a receiver for frequency shift keying, which is normally sharply tuned to the several frequencies it is desired to receive, is momentarily broadly tuned to a band of frequencies during the time when a frequency shift of a transmitted wave from one of its transmitted frequencies to another thereof is expected to take place. In this manner, when the frequency shift takes place, sufficient bandwidth of the transmitted wave will be accepted by the receiver to indicate sharply, rather than gradually, that the change in frequency has taken place. The broadening of the reception band of the receiver will be only for a very short period of time and only at the time when the change in frequency takes place in normal communication. Therefore, the amount of added noise which is received by the receiver during the period of broadened tuning will not greatly reduce the signal-to-noise ratio.

Brief description of the drawing

The invention will be better understood upon reading the following description in conjunction with the accompanying drawing in which The sole figure is a block diagram of a receiver including this invention.

Description of the preferred embodiment

Turning to the sole figure, the waves to be received are intercepted by an antenna 10 and applied to the radio frequency stages, the mixer and the intermediate stages of the receiver respresented by the rectangle 12. The output of the stages represented by the rectangle 12 is applied to the bandpass filter 14 which passes a band of frequencies including the frequencies to be received. The output of the bandpass filter is applied to one input terminal of the phase detector 16. The output of the phase detector 16 is a direct current whose amplitude varies in accordance with the phase relation between the wave applied to the input of the phase detector 16 from the filter 14 and a wave applied to another input of the phase detector 16 from a voltage controlled oscillator 18. The output of the phase detector 16 is applied through a low pass loop filter 20, which normally passes the direct current output of the phase detector 16 and normally prevents passage of the sum of the frequencies of the two inputs of the phase detector 16. The output of the loop filter 20 is applied to an amplifier 22 which has two output terminals 24 and 26. The output at the terminal 24 is applied to an indicating device (not shown), which indicates whether the voltage applied thereto by the amplifier 22 is of high voltage indicating a mark, for example, or a lower voltage indicating a space for example. The output of the amplifier 22 at the terminal 26 is applied to the voltage controlled oscillator 18 to control its frequency in a known manner.

In the operation of the receiver for frequency shift keying as so far described, the voltage appearing at the output of the phase detector 16 is a direct voltage depending in amplitude on whether the mark or the space frequency is being received. This voltage passes through the loop filter 20 and is applied to the amplifier 22. The voltage at the output terminal 26 of the amplifier 22 is applied to the voltage controlled oscillator 18 to cause the voltage controlled oscillator 18 to follow the frequency of the wave applied to the phase detector 16 from the amplifier 14. During the periods of time that the voltage at the output of the phase detector 16 is constant, as during the existence of a mark or a space frequency, the voltage passing through the filter 20 and applied to the amplifier 22 is also constant. However, this voltage varies between these two constant values when the received wave varies in frequency between its mark and its space value. The low pass filter 20 having the narrow bandpass necessary to increase the signal-to-noise ratio of the received signal will change the sharp change of output voltage of the phase detector 16 to a gradual one, whereby the output of the amplifier 22 at its terminal 24 will vary between its two levels in a gradual manner. However, upon broadening the tuning of the phase lock loop 27 (which includes the phase detector 16, the filter 20, the amplifier 22 and the oscillator 18) in a manner to be disclosed, the rate of change of the voltage level at the output terminals 24 and 26 of the amplifier 22 will follow closely the rate of change of the received frequencies. The tuning of the phase lock loop detector 27 is broadened in the following manner.

A source 28 of timing signals is provided which produces a timing pulse at the moment when a change of frequency of the transmitted wave will take place during normal frequency shift keying signalling. The output of the source 28 is applied to the wiper arm element 30 of a switch 32. The element 30 is arranged to be set either manually or by any other suitable means at one of three possible positions. When the element is set at the first position as shown in the drawing, the timing pulse is applied only to the loop filter 20 to broaden the bandpass thereof as will be explained. Alternatively, the element 30 can be set at its second position whereat the switch element 30 contacts both of the switch points 34 and 36. The timing pulse produced by the source 28 is at this position of the element 30 applied to both the loop filter 20 and to the amplifier 22, broadening the tuning of the loop filter 20 and also increasing the gain of the amplifier 22. It is known that if the amplification in the phase locked loop 27 is increased, then the frequency bandpass of the phase locked loop 27 is broadened. Therefore, the application of the pulse to the filter 20 and to the amplifier 22 has an additive effect in broadening the tuning of phase lock loop 27. As desired according to the particular application, the element 30 can be set at its third position instead of at the other two positions described above. In the third position of the switch element 30, the timing signals provided by the source 28 are applied only to the amplifier 22 to increase its gain.

In each of the three positions of the switch element 30, the timing pulse provided by the source 28 during its existence causes the described receiver to exhibit a broadened band of frequency reception. As a result, during the existence of the timing pulses, the changes in direct current output of the detector 16 (if any) are passed on without distortion to the input of the voltage controlled oscillator 18, and therefore the receiver indicates faithfully the instant of change of transmitted frequency. The speed of signal transmission of the frequency shift keying transmitter (not shown) can then be increased without increasing the error rate, or the error rate can be reduced if the speed of signal transmission is not increased, or these two effects may be combined. At all other times, except when a change in frequency is to be anticipated, the reception band of the receiver is very narrow, whereby the increase of signal-to-noise ratio of a sharply tuned frequency shift keying receiver is preserved while at the same time the moment of the change of the transmitted frequency is sharply indicated.

The broadening of the passband of the loop filter 20 can be accomplished in a known manner by using known voltage variable capacities or inductances or resistances or a combination thereof (not shown) in a known low pass filter configuration. The variation in gain of the amplifier 22 may be accomplished by using any of the known voltage variable gain controlled amplifiers.

Variations of the disclosed invention will suggest themselves to those skilled in the art. For example, the gain of the amplifier 22, the passband of the filter 20 and the frequency of the oscillator 18 may be controllable by current, or voltage or a combination thereof, whereby the variable characteristics of these elements are electronically controllable. Therefore, the above description is to be taken as illustrative and not in a limiting sense.

What is claimed is:

1. A receiver for frequency shift keying communication in which a wave of one frequency is transmitted to indicate a signal and a wave of another frequency is transmitted to indicate a different signal, said shifts in frequency having predictable normal times of occurrence known a priori at said receiver, said receiver comprising:
- means sharply frequency selective of the transmitted frequencies that are to be received,
- a source of timing signals occurring during said predicted occurrences of said shifts in frequency, and
- means to apply said timing signals to said frequency selective means to broaden the frequency selectivity of the frequency selective means only during the predicted time of change of said transmitted frequencies.

2. The invention as expressed in claim 1 in which said selective means includes a filter and electronically controlled means for broadening the tuning characteristics of said filter.

3. The invention as expressed in claim 1 in which said frequency selective means comprises a phase detector having two input terminals and an output terminal,
- means to apply a wave related to the received wave to one of said input terminals,
- a filter of variable frequency selectivity,
- a variable gain amplifier having an input terminal and an output terminal,
- a frequency controlled oscillator having a frequency control terminal and an output terminal,
- means to apply the wave appearing at the output of said phase detector to the input terminal of said amplifier through said filter,
- means for applying a wave related to the wave appearing at the output terminal of said amplifier to the control terminal of said oscillator, and
- means to apply a wave appearing at the output terminal of said oscillator to the other input terminal of said phase detector.

4. The invention as expressed in claim 1 in which said selective means comprises a phase detector having two input terminals and an output terminal,
- means to apply a wave related to the received wave to one of said input terminals,
- a variable selectivity filter,
- a variable gain amplifier having an input terminal and an output terminal,
- a frequency controlled oscillator having a frequency control terminal and an output terminal,
- means to apply the wave appearing at the output of said phase detector to the input terminal of said amplifier through said filter,
- means for applying a wave related to the wave appearing at the output terminal of said amplifier to the control terminal of said oscillator, and
- means to apply a wave appearing at the output terminal of said oscillator to the other input terminal of said phase detector,
- said filter being responsive to said timing signals which, when applied thereto, vary the selectivity of said filter to broaden the selectivity of said selective means.

5. The invention as expressed in claim 1 in which said selective means comprises a phase detector having two input terminals and an output terminal,
- means to apply a wave related to the received wave to one of said input terminals,
- a variable selectivity filter, a variable gain amplifier having an input terminal and an output terminal, a frequency controlled oscillator having a frequency control terminal and an output terminal, means to apply the wave appearing at the output of said phase detector to the input terminal of said amplifier through said filter, means for applying a wave related to the wave appearing at the output terminal of said amplifier to the control terminal of said oscillator, and means to apply a wave appearing at the output terminal of said oscillator to the other input terminal of said phase detector, said amplifier being responsive to said timing signals which, when applied thereto vary the gain of said amplifier to broaden the selectivity of said selective means.

6. The invention as expressed in claim 1 in which said selective means comprises a phase detector having two input terminals and an output terminal, means to apply a wave related to the received wave to one of said input terminals, a variable selectivity filter, a variable gain amplifier having an input terminal and an output terminal, a frequency controlled oscillator having a frequency control terminal and an output terminal, means to apply the wave appearing at the output of said phase detector to the input terminal of said amplifier through said filter, means for applying a wave related to the wave appearing at the output terminal of said amplifier to the control terminal of said oscillator, and means to apply a wave appearing at the output terminal of said oscillator to the other input terminal of said phase detector, said filter and said amplifier being responsive to said timing signals, which, when applied thereto, vary the selectivity of said filter and the gain of said amplifier to broaden the selectivity of said selective means.

7. A receiver for frequency shift keying transmission in which a wave is transmitted at one frequency to indicate one signal and a wave is transmitted at another frequency to indicate another signal, said shifts in frequency having predictable normal times of occurrence, known a priori at said receiver, said receiver comprising:

a phase detector having two input terminals and an output terminal, means to apply to one of said terminals a wave having a frequency related to the transmitted wave to be received, an electronically variable frequency selective filter having an input and an output and a control terminal, a variable gain amplifier having an input, an output and a control terminal, a frequency controlled oscillator having a control terminal and an output terminal, a source of timing signals occurring during said predicted occurrences of said shifts in frequency, a switch having several selectable conditions, means to apply the wave appearing at the output terminal of said phase detector to the input terminal of said filter, means for applying the wave appearing at the output terminal of said filter to the input terminal of said amplifier, means for applying a wave related to the wave appearing at the output terminal of said amplifier to the control terminal of said frequency controlled oscillator, means for applying the wave appearing at the output of said oscillator to the other input terminal of said phase detector, and means including said switch for applying said timing signals to either or both of said control terminals of said filter and said amplifier in accordance with the several conditions of said switch for varying the the gain of said amplifier and for varying the selectivity of said filter to broaden the selectivity of said selective means.

References Cited

UNITED STATES PATENTS

| | | | |
|---|---|---|---|
| 3,287,657 | 11/1966 | Widl | 331—17 |
| 3,328,719 | 6/1967 | De Lisle et al. | 331—17 |
| 2,712,061 | 6/1955 | McClellan. | |
| 2,730,616 | 1/1956 | Barstow | 325—423 |
| 3,217,255 | 11/1965 | Broadhead et al. | 325—420 |

ROBERT L. GRIFFIN, Primary Examiner

J. A. BRODSKY, Assistant Examiner

U.S. Cl. X.R.

325—420; 178—66, 88; 331—17